United States Patent
Gehman et al.

(10) Patent No.: US 6,496,517 B1
(45) Date of Patent: Dec. 17, 2002

(54) DIRECT ATTACH OF INTERRUPT CONTROLLER TO PROCESSOR MODULE

(75) Inventors: Judy M. Gehman, Ft. Collins, CO (US); Steven M. Emerson, Chanhassen, MN (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/001,839

(22) Filed: Nov. 21, 2001

(51) Int. Cl.[7] .................. G06F 15/00; H04L 12/413
(52) U.S. Cl. .................. 370/463; 370/419; 370/420; 370/484; 370/487; 712/31; 712/28; 712/33; 712/34
(58) Field of Search .................. 712/31, 34, 33, 712/28; 370/463, 419, 420, 484, 487

(56) References Cited

U.S. PATENT DOCUMENTS 6,353,619 B1 * 3/2000 Banas et al. .................. 370/463
6,330,658 B1 * 12/2001 Evoy et al. .................. 712/31

* cited by examiner

*Primary Examiner*—David Nelms
*Assistant Examiner*—Reneé R. Berry
(74) *Attorney, Agent, or Firm*—Trexler, Bushnell, Giangiorgi, Blackstone & Marr Ltd.

(57) ABSTRACT

A system, such as an AMBA based system, wherein an interrupt controller is coupled directly to a processor, thereby providing that the processor can access the interrupt controller without having to access a system bus. Specifically, the interrupt controller may be coupled to a port of the processor, such as a tightly coupled memory (TCM) port or a coprocessor port of the processor. The interrupt controller may be coupled to the TCM port along with SRAM.

8 Claims, 3 Drawing Sheets

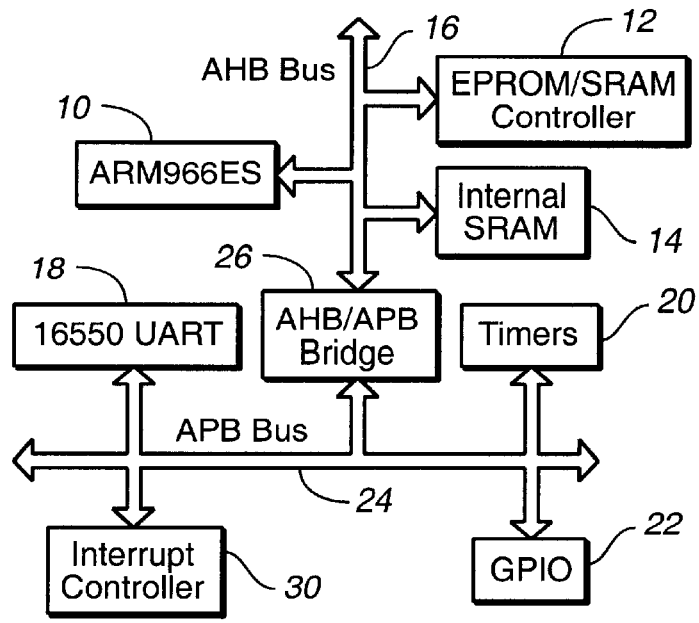
FIG._1
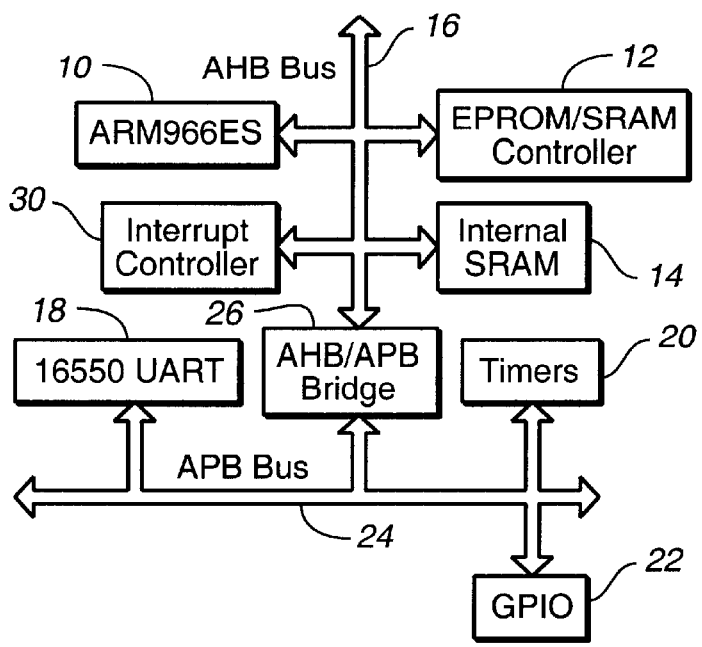
FIG._2

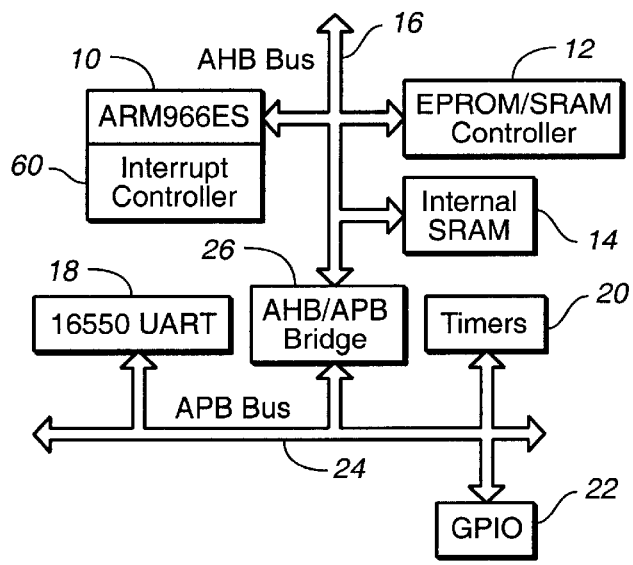
FIG._3
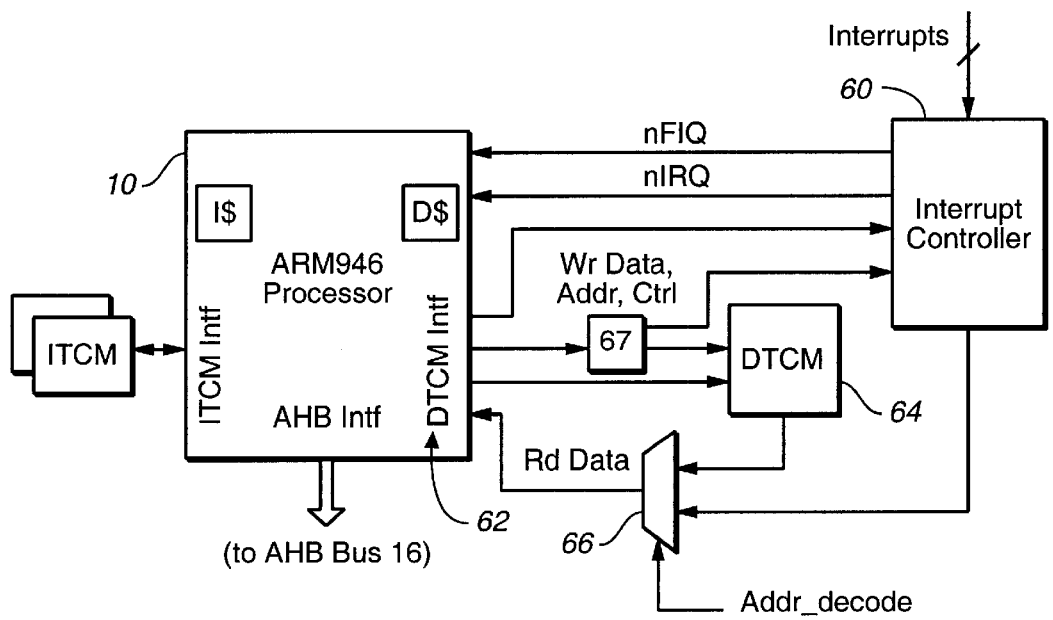
FIG._4

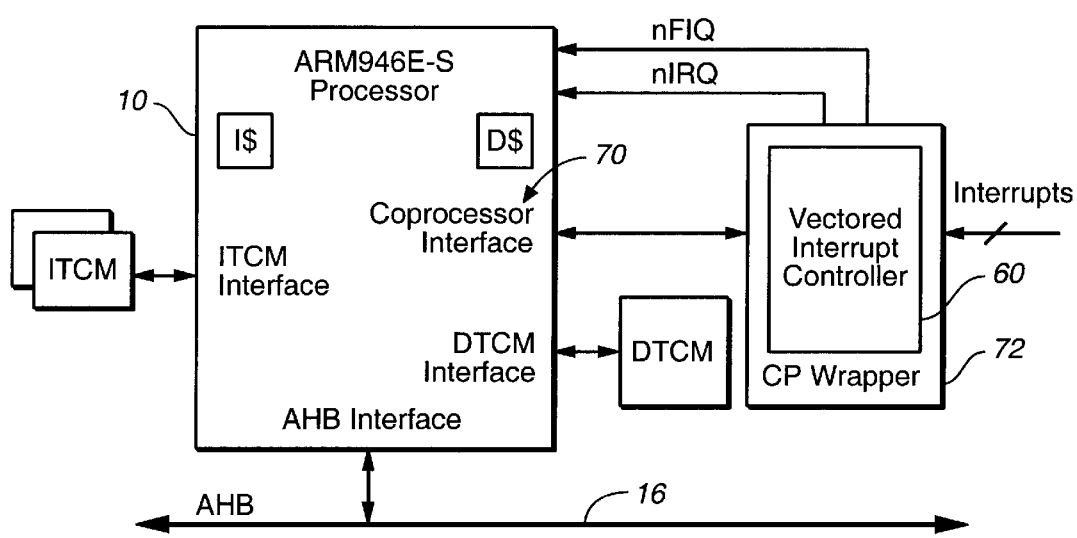
FIG._5

DIRECT ATTACH OF INTERRUPT CONTROLLER TO PROCESSOR MODULE

BACKGROUND OF THE INVENTION

The present invention generally relates to methods and devices for solving the problem of latency in servicing interrupts in a system, such as in an AMBA based system. The present invention more specifically relates to a method and device wherein an interrupt controller is coupled directly to a processor so that the processor can access the interrupt controller without having to access a system bus.

Advanced Microcontroller Bus Architecture (AMBA) is a very popular bus architecture developed by ARM Ltd., and is used by application specific integrated circuit (ASIC) vendors world-wide. AMBA is a family of buses which includes Advanced System Bus (ASB), Advanced High-performance Bus (AHB) and Advanced Peripheral Bus (APB), where AHB is typically used as a multi-master/multi-slave system bus and APB as a simplified single master peripheral bus. AMBA is used in many applications, such as wireless, telecommunications, networking, office automation, and storage. Interrupt controllers typically reside on an AMBA bus, however, a problem with AMBA based systems is latency in servicing interrupts. The problem is typically alleviated either by one or both of the following:

- employing a vectored interrupt controller to accelerate the prioritization of interrupts and calculating the interrupt service routine starting address; and/or
- by moving the interrupt controller close to the processor to reduce the access time.

A vectored interrupt controller reduces latency by determining in hardware the interrupt that needs servicing by resolving predefined priorities and then passing to the central processing unit (CPU) an index, instruction address or other tag that the CPU can use to handle the interrupt. Typically, this can be performed much quicker in hardware than within a software based scheme as is used in a non-vectored interrupt controller. The software based scheme adds latency in determining which interrupt to service.

With regard to having the interrupt controller be close to the processor, FIGS. 1 and 2 illustrate two typical AMBA systems. Each system includes a processor 10, an EPROM/SRAM controller 12 and internal SRAM 14, all on a higher bandwidth pipelined main system bus (AHB bus) 16. In both FIGURES, the processor 10 is shown as being an "ARM processor", i.e. a processor from ARM Ltd. ARM Ltd. manufactures general purpose Reduced Instruction Set Computing (RISC) processors which are popular in the industry for the applications listed above. Each system also includes a Universal Asynchronous Receiver/Transmitter (UART) 18, timers 20, and General Purpose Input/Output (GPIO) 22, all on a secondary bus (APB bus) 24. An AHB/APB bridge 26 effectively connects the AHB bus 16 to the APB bus 24. While in FIG. 1 the interrupt controller 30 is on the APB bus 24 as a slave peripheral for the processor 10 to access, in FIG. 2 the interrupt controller 30 is on the AHB bus 16.

Both of the arrangements shown in FIGS. 1 and 2 present several disadvantages with regard to the processor 10 attempting to gain access to the interrupt controller 30. In both of the arrangements, the interrupt controller 30 is physically far away form the processor 10, and the processor 10 has to arbitrate and win the AHB bus 16 in order to access the interrupt controller 30. Depending on the number of masters on the AHB bus 16, it could take numerous clock cycles for the processor 10 to win the AHB bus 16. Additionally, in some systems, the processor is running at a higher speed than the AHB bus. This increases the number of processor clock cycles required to access the interrupt controller. With regard to the arrangement shown in FIG. 1, the processor 10 has to also cross the AHB/APB bridge 26 in order to access the interrupt controller 30. This presents an additional delay. Still further, in some systems, the AHB bus is at a higher speed than the APB bus. If the interrupt controller is located on the APB bus (as shown in FIG. 1), this increases the number of processor clock cycles required to access the interrupt controller.

OBJECTS AND SUMMARY

A general object of an embodiment of the present invention is to provide a system wherein a processor can access an interrupt controller without having to access a system bus.

Another object of an embodiment of the present invention is to provide a system wherein a processor does not have to access a bus to communicate with a vectored interrupt controller, thereby leaving the bus free for other masters and providing overall improved system performance.

Still another object of an embodiment of the present invention is to provide a system wherein a processor can quickly access an interrupt controller at the processor clock speed without having to access a system bus.

Still yet another object of an embodiment of the present invention is to provide a system wherein a processor can quickly access not only data SRAM, but also an interrupt controller, at the processor clock speed without having to access a system bus.

Briefly, and in accordance with at least one of the foregoing objects, an embodiment of the present invention provides a system, such as an AMBA based system, wherein an interrupt controller is coupled directly to a processor, thereby providing that the processor can access the interrupt controller without having to access a system bus. Specifically, the interrupt controller may be coupled to a port of the processor, such as a tightly coupled memory (TCM) port or a coprocessor port of the processor. The interrupt controller may be coupled to the TCM port along with SRAM.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a block diagram which illustrates a typical AMBA based system, wherein the interrupt controller is on an APB bus;

FIG. 2 is a block diagram which illustrates another typical AMBA based system, wherein the interrupt controller is on the AHB bus along with the processor;

FIG. 3 is a block diagram which illustrates an AMBA based system which is in accordance with an embodiment of the present invention, wherein the interrupt controller is coupled directly to the processor;

FIG. 4 is a block diagram which illustrates one way to implement what is shown in FIG. 3, wherein the processor includes a data tightly coupled memory (TCM) port and the interrupt controller is coupled to the TCM port; and FIG. 5 is a block diagram which illustrates an alternative way to implement what is shown in FIG. 3, wherein the interrupt controller is coupled to the coprocessor port of the processor.

DESCRIPTION

While the invention may be susceptible to embodiment in different forms, there are shown in the drawings, and herein will be described in detail, specific embodiments with the understanding that the present disclosure is to be considered an exemplification of the principles of the invention, and is not intended to limit the invention to that as illustrated and described herein.

FIG. 3 illustrates a system, such as an AMBA based system, which is in accordance with an embodiment of the present invention. The system illustrated in FIG. 3 is similar to the systems shown in FIGS. 1 and 2 in that the system includes a processor 10, such as an ARM processor, an EPROM/SRAM controller 12, internal SRAM 14, an AHB bus 16, a UART 18, timers 20, GPIO 22, an APB bus 24, and an AHB/APB bridge 26 which effectively connects the AHB bus 16 to the APB bus 24. However, unlike the systems shown in FIGS. 1 and 2, the system shown in FIG. 3 provides that the interrupt controller 60 is coupled directly to the processor 10 as opposed to being on the AHB bus 16 or APB bus 24. As a result, the processor 10 does not have to win a bus to access the interrupt controller 60, and the processor 10 can quickly access the interrupt controller 60 at the processor clock speed. As a result of not having to win a bus (16 or 24) to access the interrupt controller 60, the bus is left free for other masters, thereby providing overall improved system performance.

FIGS. 4 and 5 illustrate two different ways of closely coupling an interrupt controller to the processor. Specifically, FIG. 4 shows the situation where an interrupt controller 60 is connected to a tightly coupled memory (TCM) port 62 on the processor 10. The processor 10 shown in FIG. 4 may be an ARM processor. Some of the ARM processors are implemented with TCM ports for each of the instruction and data CPU interfaces. There ports are intended to allow the ARM to quickly access SRAM to get instruction and data without incurring the performance penalties of accessing the system bus (i.e. the AHB bus). As a result of being coupled directly to the TCM port 62 of the processor 10, the processor 10 can quickly access the interrupt controller 60 at the processor clock speed without needing to access the system bus 16.

The configuration shown in FIG. 4 allows both data SRAM 64 and the interrupt controller 60 to share the same port 62 of the processor 10. Control logic is provided and is configured to effectively steer the correct read data back to the data TCM port 62 and to enable the correct device (i.e. the SRAM 64 or the interrupt controller 60) based on the address. Specifically, as shown in FIG. 4, the control logic preferably includes multiplexer logic 66 between the interrupt controller 60 and the processor 10, and address decode logic 67 between the SRAM 64 and processor 10 for decoding the address to generate two enables (one for the SRAM and one for the interrupt controller). The interrupt controller interface is preferably built to be the same as a synchronous memory port in order to allow easy connection to the data TCM port 62 of the processor 10.

The interrupt controller 60 shown in FIG. 4 is preferably a vectored interrupt controller because a vectored interrupt controller provides a performance advantage over a non-vectored interrupt controller. Nonetheless, the interrupt controller 60 can be a non-vectored interrupt controller which uses software to prioritize the interrupts, and a performance benefit would still be achieved. Hence, either type of interrupt controller could be used in the configuration shown in FIG. 4 to gain performance advantages. Additionally, while the processor is preferably an ARM core with a TCM port, any processor with a similar port can be used.

The configuration shown in FIG. 4 provides that the interrupt controller 60 is physically closer to the processor 10 so each access takes fewer clocks. This is especially important if the system bus (AHB) 16 clock is slower than the processor clock. Additionally, the configuration provides that the interrupt controller 60 runs at the same clock speed as the processor 10. Additionally, the processor 10 does not need to arbitrate for the system bus 16 in order to access the interrupt controller 60. This saves clock cycles waiting for a grant.

FIG. 5 shows an alternative way to implement direct coupling of the interrupt controller 60 to the processor 10. Specifically, the interrupt controller 60 (vectored or non-vectored) is connected to a coprocessor port 70 of the processor 10 to achieve similar results as the configuration shown in FIG. 4. As shown in FIG. 5, a wrapper 72 may be provided to interface the interrupt controller 60 to the processor 10. A wrapper 72 may be employed if the processor 10 does not have a data TCM port 62, but it is still desired that the interrupt controller 60 be tightly coupled to the processor 10.

Another reason to use the coprocessor port instead of a TCM port is if the TCM port address space is full (i.e. used completely by the SRAM or something else) or if it is desirable to avoid having the load of the interrupt controller on the port. There may be other reasons why one would want the interrupt controlled coupled to the coprocessor port rather than to the data TCM port. Regardless, the interrupt controller can be coupled to the coprocessor port whether or not the processor has a data TCM port.

While the configuration illustrated in FIG. 5 is an alternative to the configuration illustrated in FIG. 4, the configuration illustrated in FIG. 5 provides certain disadvantages compared to the configuration illustrated in FIG. 4. Specifically, the logic to interface to the coprocessor port 70 is more complicated than to a memory port. Additionally, coprocessor instructions are needed to access this port. For some processors (for example, ARM processors), these instructions need to be written in assembly language since the compiler does not understand them.

The configurations illustrated in FIGS. 3, 4 and 5 provide that the interrupt controller is coupled directly to the processor, as opposed to being on the AHB or APB bus. As a result, the processor does not have to win a bus to access the interrupt controller. As a result, the bus is left free for other masters, and overall system performance is improved.

While embodiments of the present invention are shown and described, it is envisioned that those skilled in the art may devise various modifications of the present invention without departing from the spirit and scope of the appended claims.

What is claimed is:

1. A system comprising:

a bus;

a processor on the bus, wherein said processor includes a tightly coupled memory port;

an interrupt controller coupled to said tightly coupled memory port of said processor, wherein said system is configured such that said interrupt controller is accessible by said processor without said processor having to utilize the bus.

2. A system as recited in claim 1, wherein said processor is an ARM processor.

3. A system as recited in claim 1, wherein said interrupt controller is a vectored interrupt controller.

4. A system as recited in claim 1, wherein said interrupt controller is a non-vectored interrupt controller configured to use software to prioritize interrupts.

5. A system as recited in claim 1, wherein said interrupt controller runs at the same clock speed as said processor.

6. A system as recited in claim 1, said processor including a port, said interrupt controller coupled to said port of said processor, said system further comprising SRAM, said SRAM also coupled to said port of said processor, wherein said SRAM and said interrupt controller share said port of said processor.

7. A system as recited in claim 6, further comprising control logic connected to said SRAM and said interrupt controller, wherein said control logic is configured to receive an address and steer correct read data back to the port of the processor, thereby enabling said SRAM or said interrupt controller based on the address which is received.

8. A system as recited in claim 1, wherein said interrupt controller is a vectored interrupt controller which runs at the same clock speed as said processor, wherein said vectored interrupt controller is coupled to said tightly coupled memory port of said processor, wherein said coupling of said vectored interrupt controller to said tightly coupled memory port of said processor provides that said processor can access said vectored interrupt controller at the clock speed of the processor.

* * * * *